United States Patent [19]

Sawano et al.

[11] Patent Number: 4,524,851
[45] Date of Patent: Jun. 25, 1985

[54] MECHANICAL SNUBBER

[75] Inventors: Susumu Sawano, Koganei; Yoshihiro Gofuku, Fujisawa; Junji Hashimoto, Kawasaki; Takayuki Ando, Yokosuka, all of Japan

[73] Assignee: Tokico Ltd., Kawasaki, Japan

[21] Appl. No.: 386,520

[22] Filed: Jun. 9, 1982

[30] Foreign Application Priority Data

Jun. 11, 1981 [JP] Japan ................... 56-90057

[51] Int. Cl.³ .............. F16F 7/04; F16F 7/10
[52] U.S. Cl. ................... 188/134; 188/378; 188/381; 248/58; 248/636; 248/DIG. 1
[58] Field of Search ........... 188/134, 378, 379, 381; 248/58, 636, DIG. 1

[56] References Cited

U.S. PATENT DOCUMENTS

| 2,471,857 | 5/1949 | Bleakney et al. | 188/378 |
| 3,966,023 | 6/1976 | Huang et al. | 188/381 |
| 3,983,965 | 10/1976 | Wright, Jr. | 188/381 X |
| 4,236,606 | 12/1980 | Sunakoda et al. | 188/134 X |
| 4,346,793 | 8/1982 | Fuse et al. | 188/378 X |
| 4,396,096 | 8/1983 | de Groot et al. | 188/134 |

Primary Examiner—George E. A. Halvosa
Attorney, Agent, or Firm—Oblon, Fisher, Spivak, McClelland & Maier

[57] ABSTRACT

The combination of a cylindrical casing, a rod member axially reciprocable in the casing, a rotary member fitted in the casing and rotatable therein in relation with axial displacement of the rod member, an inertia member rotatably fitted in the casing opposingly to the rotary member, and a rotation control member interposed between the rotary and inertia members and adapted to rotate the inertia member with the rotary member in rotation at a low speed and to move the inertia member axially away from the rotary member in rotation at a high speed to abut the inertia member against a wall portion of the casing to restrict the rotation of the rotary member. An intermediate brake is provided between the rotary and inertia members to apply a force resistive to relative rotational displacement of the rotary and inertia members.

9 Claims, 7 Drawing Figures

MECHANICAL SNUBBER

BACKGROUND OF THE INVENTION (1) Field of the Invention

This invention relates to a mechanical snubber to be interposed between a support body and a load to be supported thereon, the snubber being constructed to permit slow relative displacements of the support body and load while restricting quick motions of the load relative to the support body.

(2) Description of the Prior Art

The snubbers which are used for snubbing vibrations of pipings in nuclear or chemical plants are required on one hand to permit slow displacements of pipings as caused by thermal expansion thereof and on the other hand to be able to restrict quick or abrupt motions of the pipings sufficiently at the time of earthquakes or on other occasions. The known oil dampers can serve for these purposes but they have a problem in that the periodical maintenance and service which is necessary to check for deteriorations of the oil is practically difficult especially when they are installed in those places which are under influence of nuclear radiation. Therefore, there have been developed and widely used the so-called mechanical type vibration snubbers in place of the oil type snubbers.

An example of such mechanical snubber is disclosed in U.S. Pat. No. 4,236,606, where the snubber is provided with a rotary body which is rotated in relation with externally induced linear motion, an inertia member which is disposed opposingly to the rotary body and rotationally connectible therewith through interposed balls serving as rotation control means as long as the externally induced linear motion is of small momentum to permit displacement of the snubber. When the externally induced linear motions is of high momentum, the inertia member is lagged behind the rotatable body in rotation and moved away therefrom to generate a braking force.

However, the prior art snubber has a high dynamic spring constant at the natural frequency of vibration of the unit (as will be discussed in greater detail hereinlater), so that there is possibilities of imposing a great load on the piping or other supported body and instabilizing the vibration snubbing action due to resonance of the inertia member.

SUMMARY OF THE INVENTION

With the foregoing situations in view, the present invention has as its object the provision of a mechanical snubber which is capable of supporting pipings or other bodies with a stable vibration snubbing effect.

It is another object of the present invention to provide a mechanical snubber in which the peak value of the dynamic spring constant at the natural frequency of vibration of the unit is lowered to prevent imposition of large loads on the supported body as well as resonance of the inertia member.

According to the present invention, the above-mentioned objects are attained by the provision of a snubber which comprises in combination: a cylindrical casing; a rod member axially reciprocable in the casing; a rotary member fitted in the casing and rotatable therein in relation with axial displacement of the rod member; an inertia member rotatably fitted in the casing opposingly to the rotary member; a rotation control member interposed between the rotary and inertia members and adapted to rotate the inertia member with the rotary member in rotation at a low speed and to move the inertia member axially away from the rotary member in rotation at a high speed to abut the inertia member against a wall portion of the casing to restrict the rotation of the rotary member; and an intermediate brake provided between the rotary and inertia members to apply a resistive force to relative rotational displacement of the rotary and inertia members.

The above and other objects, features and advantages of the present invention will become apparent from the following description and appended claims, taken in conjunction with the accompanying drawings which show by way of example some preferred embodiments of the invention.

DESCRIPTION OF PREFERRED EMBODIMENTS

Figure 1:
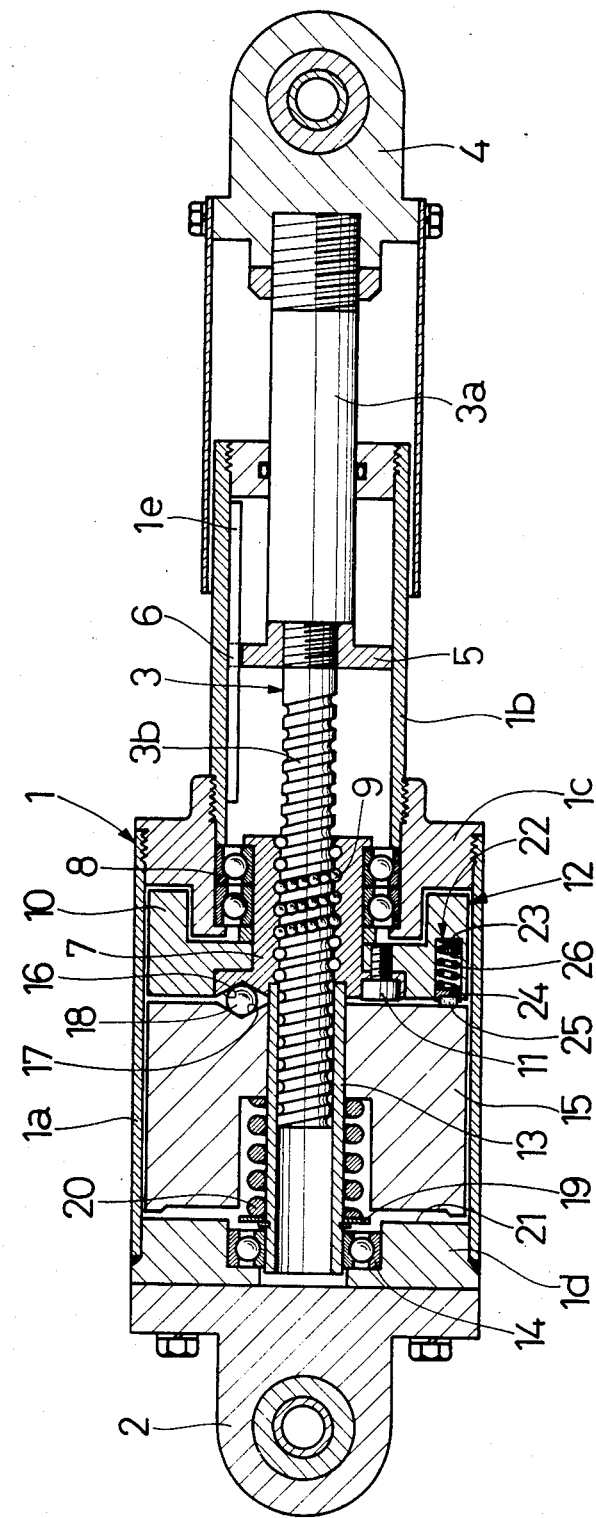
FIG. 1 is a longitudinal section of a mechanical snubber embodying the present invention.

Referring first to FIG. 1, the snubber according to the present invention includes a generally cylindrical casing 1 which is provided with a larger-diameter portion 1a and a smaller-diameter portion 1b which are threadedly connected with each other through a connecting member 1c. The outer end of the larger-diameter portion 1a is securely fixed to a base member 1d by welding or other suitable means. The base member 1d has a bracket 2 secured thereto for connecting the snubber to a support structure such as a wall, ceiling or the like. Inserted longitudinally in the casing 1 is a rod 3 which is provided with a bracket 4 threaded into its outer end for connecting the snubber to piping or other structures to be supported. The rod 3 consists of a shank 3a and an externally threaded screw portion 3b which is threadedly connected to the inner end of the shank 3a. The shank 3a is provided with a flange 5 with a keyway 6 on the outer periphery thereof for engagement with a key 1e which is provided on the inner periphery of the smaller-diameter portion 1b to block rotation of the rod 3. Thus, the rod 3 is permitted to reciprocate only in the axial direction. The screw portion 3b is in threaded engagement with an internally threaded ball nut 7 which is rotatably supported through a bearing 8 by the connecting member 1c which constitutes part of the casing 1. A multitudes of balls 9 are interposed between the roots of the screw threads of the ball nut 7 and the screw portion 3b. An axial displacement of the screw rod 3b is converted into a rotational movement of the ball nut 7 by the balls 9, as in turn therewith a rotary member 10 which is securely mounted on the ball nut 7. Thus, the ball nut 7 and rotary member 10 constitutes a rotary assembly 12 which is rotatable according to the axial displacement of the rod 3.

Figure 2:
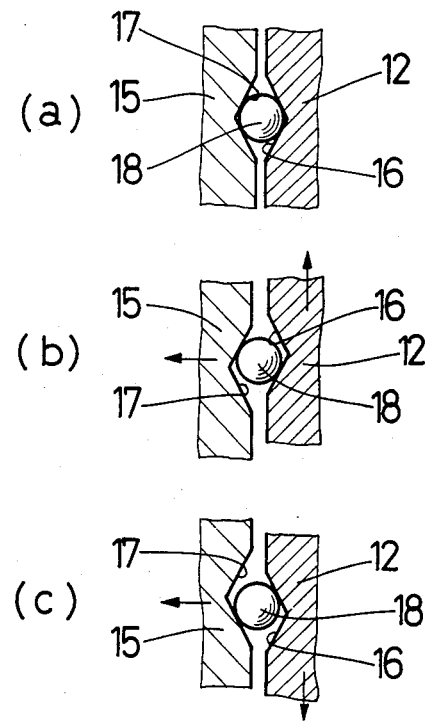
FIGS. 2(a) to 2(c) are enlarged fragmentary views employed for explaining the operation of ball members which constitute a rotation control means.

A sleeve 13 which has its one end securely fitted in the ball nut 7 by press-fitting or other suitable means has the other end journalled in the base member 1d through a bearing 14. The sleeve 13 is mirror-finished on its outer periphery and has an inertia member 15 slidably and rotatably fitted thereon. The rotary and inertia members 12 and 15 are provided with a plural number of conical recesses 16 and 17, respectively, which are formed in face-to-face relation on the opposing faces of the rotary and inertia members 12 and 15. As shown particularly in FIGS. 2(a) to 2(c), these recesses 16 and 17 are shaped such that they become gradually shallower from the respective center roots in the rotational directions of the rotary and inertia members 12 and 15. Each pair of the angular recesses 16 and 17 hold rotatably therebetween a ball 18 which functions as a rotation control member.

The sleeve 13 is provided with a spring seat 19 projectingly in its outer end portion on the side of the base member 1d to receive one end of a compression spring 20 which is interposed between the spring seat 19 and the inertia member 15. The inertia member 15 is constantly urged toward the rotary member 12 by the biasing force of the spring 20 and spaced from the inner end face of the base member 1d by a small gap (e.g., 1 mm). The inner end face of the base member 1d constitutes a braking surface 21 to be abutted against the outer end face of the inertia member 15 to restrict its rotational movement when the latter is axially displaced against the action of the spring 20.

The reference numeral 22 denotes an intermediate brake which is provided on the rotary member 10 and which is constituted by a bore 23 formed into the rotary member 10, a guide member 24 slidably fitted in the bore 23, a lining 25 of a friction material like asbestos or the like which is securely bonded to the guide member 24, and a spring 26 charged between the bottom wall of the recess 23 and the guide 24 to press the lining 25 against the end face of the inertia member 15. The intermediate brake serves to apply a resistance to relative rotational displacements of the rotary and inertia members 12 and 15. The biasing force of the spring 26 is smaller than that of the spring 20.

Now, assuming that the piping which is supported on the bracket 4 undergoes a deformation (elongation, contraction or bending) due to a temperature variation, the deformation takes place very slowly so that the rod 3 is moved axially at an extremely low speed. The axial displacement of the rod 3 causes the rotary assembly which consists of the ball nut 7 and rotary member 10 to turn about the rod 3. In this instance, the ball screw 9 which converts the axial displacement of the rod 3 to an angular rotation of the rotary member 12 has a high screw efficiency, so that the movement of the rod 3 is met by only a small resistance. Since the inertia member 15 is pressed against the rotary member 12 through the balls 18, in the state shown in FIG. 2(a), ahd the lining 25 of the intermediate brake 22 is held in pressed engagement with the opposing end face of the inertia member 15, the inertia member 15 is slowly rotated along with the rotary member 12 substantially integrally therewith. Consequently, the resistance to a slow displacement of the rod 3 is determined by the screw efficiency of the ball screw portion and the inertial torque acting against rotation of the rotary and inertia members 12 and 15.

Now, if the rod 3 is put in quick vibrational motion by earthquakes or an intense vibrational force which is externally applied to the snubber, the rod 3 is displaced in the axial direction at a high speed, rotating the rotary member 12 quickly. However, as the inertia member 15 is unable to follow the quick rotational movements of the rotary member 12 due to its inertial force, there arises a phase lag between the rotational movements of the rotary and inertia members 12 and 15. Therefore, the balls 18 in the angular recesses 16 and 17 are shifted from the position of FIG. 2(a) to the position of either FIG. 2(b) or 2(c), riding onto the sloped portion of the recesses 16 and 17 to displace the inertia member 15 axially in a direction away from the rotary member 12 against the biasing force of the spring 20. As the phase lag becomes greater, the inertia member 15 is abutted against the braking surface 21 formed on the base member 1d to produce a frictional resistance to the rotation of the inertia and rotary members 15 and 12, thereby restricting their quick motions to protect the piping against intense vibrations.

Figure 3:
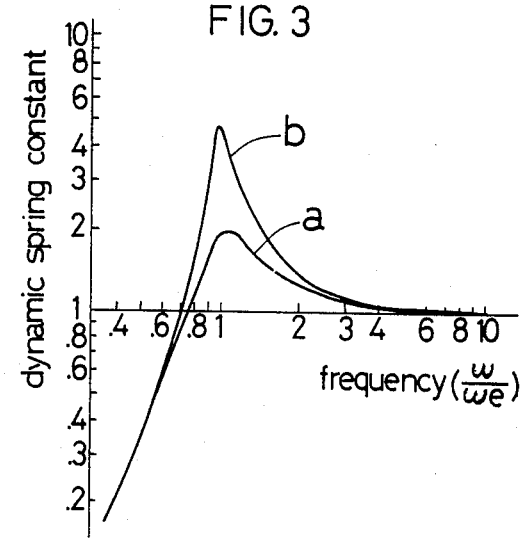
FIG. 3 is a graphic illustration showing the relationship between the input vibration frequency and dynamic spring constant in the snubber according to the present invention, in comparison with the characteristics of the conventional counterpart.

The relationship between the input displacement of the snubber and the resistance can be expressed in terms of the dynamic spring constant K, as follows.

$$K \equiv \left| \frac{F}{x} \right| =$$

$$k_e \left( \frac{\omega}{\omega_e} \right) \left| \frac{\left( \frac{\omega}{\omega_e} \right)^2 + 4h_e^2}{\left\{ 1 - \left( \frac{\omega}{\omega_e} \right)^2 \right\}^2 + 4h_e^2 \left( \frac{\omega}{\omega_e} \right)^2} \right|^{\frac{1}{2}}$$

where
x: displacement
F: applied vibratory force
$k_e$: spring constant of the rod to the base member
$\omega$: frequency of the applied vibratory force
$\omega_e$: natural frequency of the snubber
$h_e$: equivalent attenuation ratio The frequency diagram of FIG. 3 depicts the dynamic spring constant K against the input frequency, in which the curve (a) represents the characteristics of the snubber according to the present invention and the curve (b) the characteristics of the conventional snubber without the intermediate brake. As clear therefrom, when the input frequency ($\omega$) is lower than the natural frequency ($\omega_e$), namely, when the input displacement is low in speed, an anti-vibratory force is produced by the inertia mass of the inertia and rotary members. On the other hand, if the input frequency ($\omega$) is greater than the natural frequency ($\omega_e$), namely, if the input displacement is of high speed, a frictional resistance is produced by abutment of the inertia member against the braking surface of the base member, thereby restricting the rotation of the inertia and rotary members. Therefore, in this case, the anti-vibratory force shows a certain value which is determined by the spring rigidity of the snubber.

It is also clear from the diagram that the dynamic spring constant shows a peak value when the input frequency ($\omega$) is at the natural frequency ($\omega_e$). This is because the frictional resistance to the rotation of the inertia member is minimized in order to ensure a least possible resistance to the low-speed displacements, so that the inertia member is put in resonance as soon as it is lagged behind the rotary member in rotational phase until its rotation is restricted by abutting contact with the braking surface. Since practically there has to be provided a gap space of about 1 mm between the opposing faces of the inertia and rotary members, it is difficult to utilize the frictional contact of the inertia member with the braking surface of the base member to avoid a conspicuously high peak value in that operational range. As indicated by curve (b) in FIG. 3 with an input frequency ($\omega$), the prior art snubber shows an attenuation ratio ($h_e$) of about 0.08–0.12 and a dynamic spring constant (K) which is about four to five times greater than that in high-frequency range.

As a matter of fact, the snubber is preferred to have operating characteristics with a dynamic spring constant which is extremely small at low frequencies and rises to a certain stationary level at high frequencies without showing an extremely high peak value in the intermediate frequency range. Namely, if the peak at the natural frequency reaches a level which is almost four to five times higher than the stationary level of the high frequency range as in the conventional snubber, there arise serious problems such as the possibility of imposing a great load on the piping or other supported body and instabilisation of the snubbing action due to resonance of the inertia member. Therefore, it is necessary for the improvement of the performance quality of the snubber to lower the afore-mentioned peak value as much as possible.

In this regard, the snubber according to the present invention is provided with an intermediate brake 22 between the rotary and inertia members 12 and 15 thereby to apply a braking force against relative rotational displacement between the rotary and inertia members 12 and 15. This braking force is applied constantly until the inertia member 15 which has been moved away from the rotary member is abutted against the braking surface 21. Consequently, the resonance of the inertia member 15 is suppressed to preclude its instable rotations or axial vibrations as caused by such rotations.

According to the results of experiments by the present inventors, the snubber of the invention which is provided with the intermediate brake 22 between the rotary and inertia members 12 and 15 showed an attenuation ratio of 0.2–0.3 at the natural frequency ($\omega_e$), with a peak value 1.8 to 2.5 times higher than the stationary level in the high frequency range, substantially half of the peak value in the conventional snubber. Therefore, the anti-vibratory action in the vicinity of the natural frequency ($\omega_e$) is extremely stabilised. Of course, in the case of a slow motion where the input frequency ($\omega$) is smaller than the natural frequency ($\omega_e$), the rotary and inertia members 12 and 15 are permitted to rotate integrally with each other without meeting a large resisting force. On the other hand, if a high-speed motion is induced by an input force having a frequency ($\omega$) higher than the natural frequency ($\omega_e$), the inertia member 15 is abutted against the braking surface 21 to restrict rotation of the rotary member 12.

Figure 4:
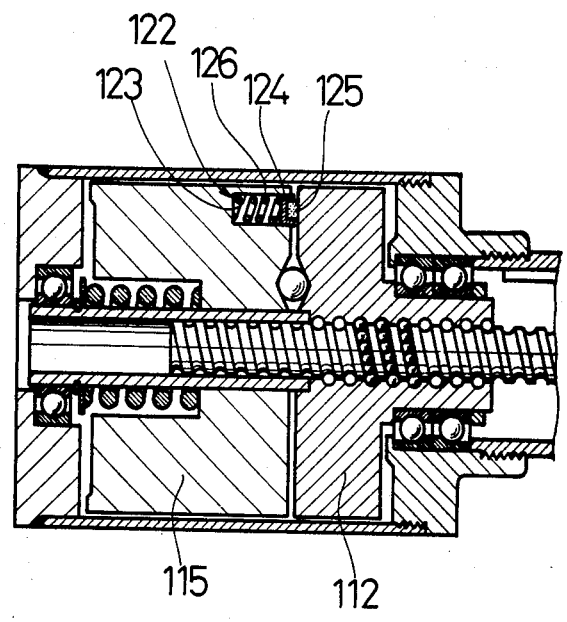
FIG. 4 is a fragmentary longitudinal section of another embodiment of the present invention.

FIG. 4 illustrates another embodiment of the present invention, in which an intermediate brake 122 provided on the side of the inertia member 115. Namely, the inertia member 115 is provided with a bore 123, a guide member 124 slidably fitted in the bore 123, a lining 125 securely adhered to the guide 124, and a spring 126 interposed between the bottom wall of the bore 123 and the guide member 124 to urge the lining 125 into pressing contact with the end face of the rotary member 112. In other respects, this modification is same as the first embodiment except that the rotary member 112 is formed integrally with the ball nut.

The operation and effects of the intermediate brake 122 which is provided on the inertia member 115 are same as in the foregoing first embodiment.

Figure 5:
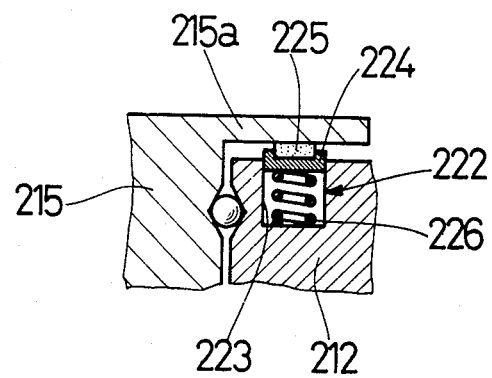
FIG. 5 is a view similar to FIG. 4 but showing still another embodiment of the invention.

Referring to FIG. 5, there is shown a further embodiment of the invention, wherein the inertia member 215 is provided with an axial extension 215a which is projected axially from the outer peripheral edge of the inertia member 215 for cooperation with an intermediate brake 222 provided on the outer periphery of the rotary member 212 which is received in the axial extension 215a. In this instance, the bore 223 is formed radially into the circumference of the rotary member 212, receiving slidably therein the guide member 224. The brake lining 225 which is securely bonded to the guide member 224 is urged radially outward for pressing contact with the inner peripheral wall of the axial extension 215a similarly by a compression spring 226.

The intermediate brake 222 of such construction can maintain a constant frictional force irrespective of the relative positions of the inertia and rotary members 215 and 212. Of course, the axial extension may be provided on the part of the rotary member 212 for cooperation with an intermediate brake 222 on the outer periphery of the inertia member 215.

Although the snubber of the present invention can be particularly suitably used for providing an anti-vibratory support for the piping in a nuclear plant, it is not necessarily limited to such use and can be advantageously used in those places which are not easily accessible for maintenance and service, for example, in a chemical plant operating in a toxic gas atmosphere. Further, the positions of the brackets 2 and 4 which have been described as being connected to a support body and a load to be supported thereon, respectively, may be switched if desired. It is to be understood that the snubber shown in FIG. 1 is merely one embodiment of the present invention and that it is possible to apply the intermediate brake 22, 122 or 222 of the present invention to snubbers of other types, for instance, to the snubber of the afore-mentioned U.S. Pat. No. 4,236,606.

What is claimed is:

1. A mechanical snubber, comprising in combination:
   a cylindrical casing;
   a rod member axially reciprocably fitted in said casing;
   a rotary member fitted on said rod member and rotated by axial displacement of said rod member;
   an inertia member rotatable in face-to-face relation with said rotary member;
   a braking surface disposed in said cylindrical casing adjacent to said inertia member, said braking surface normally being disposed a small distance from said inertia member;
   a first spring biasing said inertia member away from said braking surface and toward said rotary member;
   a rotation control means provided between said rotary and inertia members and adapted to rotate said inertia member substantially in synchronism with said rotary member during slow rotary motion and to move said inertia member away from said rotary member and in to braking contact with said braking surface during quick rotary motion; and an intermediate brake provided between said rotary and inertia members, said intermediate brake including a bore axially disposed in either of said rotary and inertia members and opening against an end face of the other of said rotary and inertia members, a friction element, and a second spring disposed within said bore and arranged to press said friction element against said end face of the other of said rotary and inertia members, said second spring biasing said rotary member and said inertia member apart, but said first spring being stronger than said second spring, whereby said second spring does not cause said inertia member to move against said braking surface.

2. A mechanical snubber comprising:
(a) a casing;
(b) a rod member axially reciprocably fitted in said casing;
(c) first means for preventing rotation of said rod member relative to said casing;
(d) a rotary member mounted on said rod member and operatively connected thereto such that axial displacement of said rod member causes rotation of said rotary member;
(e) an inertia member disposed in said casing adjacent to said rotary member, said inertia member being both slidable and rotatable relative to said casing;
(f) a braking surface disposed in said casing adjacent to said inertia member on the opposite side thereof from said rotary member, said braking surface normally being disposed a small distance from said inertia member;
(g) second means biasing said inertia member away from said braking surface and toward said rotary member;
(h) a rotation control means disposed between said rotary member and said inertia member, said rotation control means operatively connecting said rotary member to said inertia member such that:
  (i) during slow rotary motion of said rotary member, said inertia member rotates substantially in synchronism with said rotary member without exerting a substantial braking force on said rotary member or said rod member and said inertia member does not slide axially in said casing and,
  (ii) during quick rotary motion of said rotary member, said inertia member lags behind the rotary motion of said rotary member and said inertia member is moved axially against the biasing force of said second means into engagement with said braking surface, thereby braking the rotary motion of said inertia member, the rotary motion of said rotary member, and the axial motion of said rod member; and
(i) an intermediate brake operatively disposed between said rotary member and said inertia member so as to apply a continuous resistance to relative rotation between said rotary member and said inertia member, said intermediate brake comprising:
  (i) a friction element in contact with a surface of one of said rotary member and said inertia member and
  (ii) third means biasing said friction element into continuous contact with said surface of one of said rotary member and said inertia member, said third means being ineffective to cause said inertia member to move against said braking surface.

3. A mechanical snubber as recited in claim 2 wherein:
(a) said second means comprises a first spring;
(b) said intermediate brake further comprises a bore disposed in the other of said rotary member and said inertia member; and
(c) said third means comprises a second spring disposed in said bore, said second spring biasing said rotary member and said inertia member apart, but said first spring being stronger than said second spring, whereby said second spring does not cause said inertia member to move against said braking surface.

4. A mechanical snubber as recited in claim 3 wherein said bore is parallel to the axis of said rod member.

5. A mechanical snubber as recited in claim 3 wherein said bore is perpendicular to the axis of said rod member, whereby the braking force of said intermediate brake is constant regardless of relative axial displacement of said rotary member and said inertia member.

6. A mechanical snubber comprising:
(a) a casing;
(b) a linearly translatable member which is reciprocable in said casing but which is prevented from rotating relative to said casing;
(c) a first rotary member disposed in said casing, said first rotary member being operatively connected to said linearly translatable member such that linear displacement of said linearly translatable member causes rotation of said first rotary member;
(d) a second rotary member disposed in said casing adjacent to said first rotary member, said second rotary member being both rotatable and linearly translatable relative to said first rotary member;
(e) a braking surface disposed in said casing adjacent to one of said rotary members on the opposite side thereof from the other of said rotary members, said braking surface normally being disposed a small distance from said one of said rotary members;
(f) first means biasing said one of said rotary members away from said braking surface and toward said other of said rotary members;
(g) a rotation control means disposed between said first and second rotary members, said rotation control means operatively connecting said first and second rotary members such that:
  (i) during slow rotary motion of said first rotary member, said second rotary member rotates substantially in synchronism with said first rotary member without exerting a substantial braking force on said first rotary member or said linearly translatable member and said second rotary member does not translate linearly relative to said first rotary member and,
  (ii) during quick rotary motion of said first rotary member, said second rotary member lags behind the rotary motion of said first rotary member and said second rotary member translates linearly against the biasing force of said first means into engagement with said braking surface, thereby braking the rotary motion of said second rotary member, the rotary motion of said first rotary member, and the linear motion of said linearly translatable member; and
(h) an intermediate brake operatively disposed between said first and second rotary members so as to apply a continuous resistance to relative rotation between said first and second rotary members, said intermediate brake comprising:
  (i) a friction element in contact with a surface of one of said rotary members and
  (ii) second means biasing said friction element into continuous contact with said surface of one of said rotary members, said second means being ineffective to cause said second rotary member to move against said braking surface.

7. A mechanical snubber as recited in claim 6 wherein:
  (a) said first means comprises a first spring;
  (b) said intermediate brake further comprises a bore disposed in the other of said rotary members; and
  (c) said second means comprises a second spring disposed in said bore, said second spring biasing said first and second rotary members apart, but said first spring being stronger than said second spring, whereby said second spring does not cause said one of said rotary members to translate linearly into contact with said braking surface.

8. A mechanical snubber as recited in claim 7 wherein said bore is parallel to the direction of motion of said linearly translatable member.

9. A mechanical snubber as recited in claim 7 wherein said bore is perpendicular to the direction of motion of said linearly translatable member, whereby the braking force of said intermediate brake is constant regardless of relative linear displacement of said first and second rotary members.

* * * * *